(12) United States Patent
Wieczorek

(10) Patent No.: US 8,781,198 B2
(45) Date of Patent: Jul. 15, 2014

(54) HIGH CONTRAST IMAGING AND FAST IMAGING RECONSTRUCTION

(75) Inventor: Herfried Karl Wieczorek, Aachen (DE)

(73) Assignee: Koninklijke Philips N.V., Eindhoven (NL)

(*) Notice: Subject to any disclaimer, the term of this patent is extended or adjusted under 35 U.S.C. 154(b) by 637 days.

(21) Appl. No.: 13/122,984

(22) PCT Filed: Oct. 6, 2009

(86) PCT No.: PCT/IB2009/054366
§ 371 (c)(1),
(2), (4) Date: Apr. 7, 2011

(87) PCT Pub. No.: WO2010/041196
PCT Pub. Date: Apr. 15, 2010

(65) Prior Publication Data
US 2011/0194747 A1 Aug. 11, 2011

Related U.S. Application Data

(60) Provisional application No. 61/104,440, filed on Oct. 10, 2008.

(51) Int. Cl.
*G06K 9/00* (2006.01)
*G06T 5/10* (2006.01)
*G06T 5/00* (2006.01)
*G06T 11/00* (2006.01)

(52) U.S. Cl.
CPC .......... *G06T 5/008* (2013.01); *G06T 2211/424* (2013.01); *G06T 5/10* (2013.01); *G06T 2207/10104* (2013.01); *G06T 2207/10108* (2013.01); *G06T 2207/20056* (2013.01); *G06T 2211/416* (2013.01); *G06T 11/006* (2013.01)
USPC ............................ 382/131; 382/128; 382/130

(58) Field of Classification Search
None
See application file for complete search history.

(56) References Cited

U.S. PATENT DOCUMENTS 6,028,907 A * 2/2000 Adler et al. .......... 378/4
6,031,929 A * 2/2000 Maitz et al. .......... 382/132
6,442,288 B1 * 8/2002 Haerer et al. .......... 382/128

(Continued)

FOREIGN PATENT DOCUMENTS

WO 2006082590 A2 8/2006

OTHER PUBLICATIONS

Liow et al ("The convergence of object dependent resolution in maximum likelihood based tomographic image reconstruction", 1993).*

(Continued)

*Primary Examiner* — Avinash J Yentrapati

(57) ABSTRACT

When reconstructing low-collimation nuclear scan data (18) (e.g., SPECT) into a nuclear image volume (19), a spatial frequency-dependent (SFD) filter function is applied in Fourier space to the reconstructed image (19) to improve image resolution given a predefined number of reconstruction iterations and/or to reduce the number of reconstruction iterations required to achieve a predetermined level of image resolution. Size of an object to be imaged is determined, and the SFD filter function is determined or generated based on signal power spectrum (and/or modulated transfer function) data, object size, and desired image quality (or number of reconstruction iterations). The SFD filter function amplifies higher-energy components (e.g., corresponding to a lesion or tumor, or the like) of the spatial frequency spectrum to improve viability in a low collimated nuclear image (19) using fewer reconstruction iterations.

21 Claims, 7 Drawing Sheets

(56) References Cited

U.S. PATENT DOCUMENTS

| | | | |
|---|---|---|---|
| 7,617,080 B2 * | 11/2009 | Barbour et al. | 703/2 |
| 2005/0002550 A1 * | 1/2005 | Jabri et al. | 382/131 |
| 2005/0078861 A1 * | 4/2005 | Usikov | 382/131 |
| 2005/0135664 A1 * | 6/2005 | Kaufhold et al. | 382/131 |
| 2005/0286749 A1 * | 12/2005 | De Man et al. | 382/131 |
| 2006/0182327 A1 * | 8/2006 | Mundy et al. | 382/132 |
| 2006/0269114 A1 * | 11/2006 | Metz | 382/131 |
| 2008/0240535 A1 * | 10/2008 | Frangioni et al. | 382/131 |
| 2009/0003679 A1 * | 1/2009 | Ni et al. | 382/132 |
| 2010/0046817 A1 * | 2/2010 | Goedicke et al. | 382/131 |
| 2011/0103657 A1 * | 5/2011 | Kang et al. | 382/128 |
| 2011/0194747 A1 * | 8/2011 | Wieczorek | 382/131 |
| 2012/0076389 A1 * | 3/2012 | Vija et al. | 382/132 |
| 2013/0121549 A1 * | 5/2013 | Pekar et al. | 382/128 |

OTHER PUBLICATIONS

Glick, S. J., et al.; Reducing the Computational Load of Iterative SPECT Reconstruction; 1995; IEEE Trans. on Nuclear Science Symposium and Medical Imaging Conference; 3:1219-1223.

Hoffman, E. J., et al.; Quantification in Positron Emission Computed Tomography: 1. Effect of Object Size; 1979; J. Computer Assisted Tomography; 3(3)299-308.

Li, X., et al.; A Noise Reduction Method for Non-Stationary Noise Model of SPECT Sinogram based on Kalman Filter; 2001; IEEE Nuclear Science Symposium Conf. Record; 4:2134-2138.

Hudson, H. M., et al.; Accelerated Image Reconstruction using Ordered Subsets of Projection Data; 1994; IEEE Trans. on Medical Imaging; XX(Y)100-108.

Pretorius, P. H., et al.; Reducing the influence of the partial volume effect on SPECT activity quantification with 3D modelling of spatial resolution in iterative reconstruction; 1998; Phys. Med. Biol.; 43:407-420.

Rousset, O. G., et al.; Correction for Partial Volume Effects in Emission Tomography; In: Habib Zaidi: Quantitative Analysis in Nuclear Medicine Imaging; 2006; Springer; pp. 236-271.

Wieczorek, H.; SPECT Image Quality and Quantification; 2006; IEEE Nuclear Science Symposium Conf. Record; pp. 2854-2858.

* cited by examiner

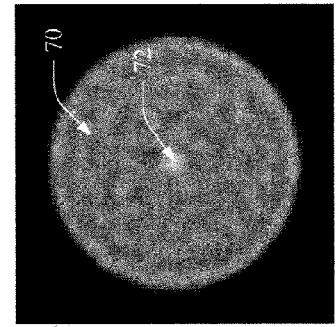
FIG. 4D
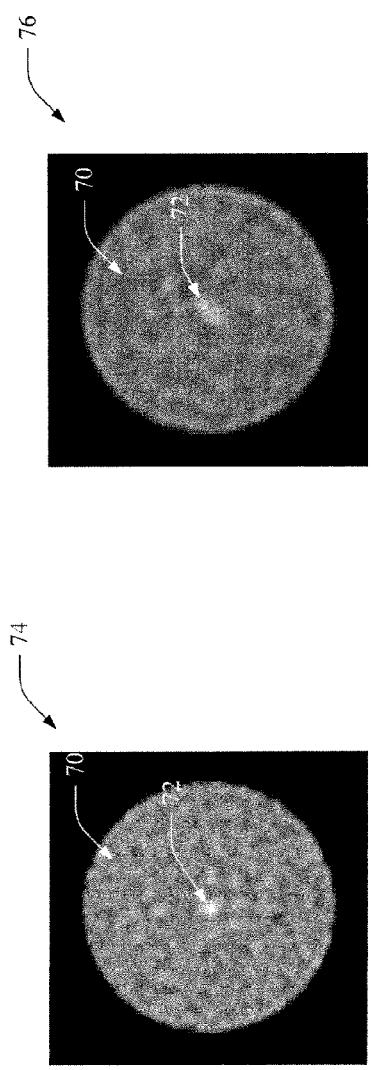
FIG. 4B
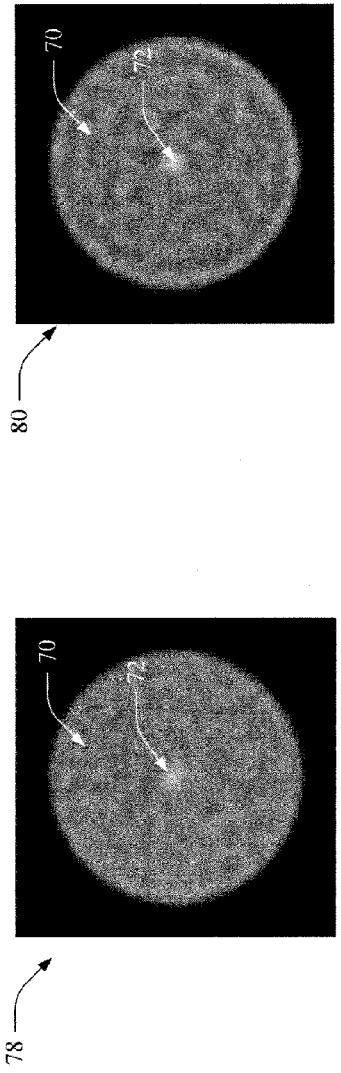
FIG. 4C
FIG. 4A

HIGH CONTRAST IMAGING AND FAST IMAGING RECONSTRUCTION

CROSS REFERENCE TO RELATED APPLICATIONS

This application claims the benefit of U.S. provisional application Ser. No. 61/104,440 filed Oct. 10, 2008, which is incorporated herein by reference.

The present innovation finds particular application in anatomic and functional imaging systems, particularly nuclear imaging such as single photon emission computed tomography (SPECT), positron emission tomography (PET), and the like. However, it will be appreciated that the described technique may also find application in other imaging systems, other image processing scenarios, other image reconstructing techniques, and the like.

SPECT cameras use collimators for imaging of gamma quanta. Every collimation elicits a trade-off between system efficiency and spatial resolution. The use of low collimation, and thus higher signal-to-noise ratio (SNR), in combination with resolution recovery is valuable. Low collimation (short collimator septa) has an advantage in terms of SNR, specifically in the low frequency part of the detective quantum efficiency (DQE), a standard measure of image quality well known in x-ray imaging. The problem with low collimation is a low DQE in the medium and high spatial frequency range. This impedes the detection of small structures, e.g. small lesions in oncology.

SPECT images are usually reconstructed in 2D transaxial slices or 2D projections, i.e. in a 2D reconstruction. The typical size of one reconstructed slice is 64×64 voxels in cardiac SPECT. For high quality images, especially in oncology, a larger matrix size such as 128×128 is desirable. In other imaging modalities, larger matrix sizes are common. When quantitative information is important, an iterative reconstruction algorithm with a high number of iterations, typically 8 to 32, is useful to provide this information (See, e.g., H. Wieczorek, "SPECT Image Quality and Quantification," 2006 IEEE Nuclear Science Conference Record, pp. 2854-2858 (2006)). For these reasons, classical iterative SPECT reconstruction approaches are highly time-consuming.

Large reconstructed volumes, such as a 128×128×128 matrix used for imaging a volume of interest, are desirable to detect small tumors or other small volumes, but they require about 16 times longer for reconstruction than the typical 64×64×64 matrix used in conventional Cardiac SPECT. The 8 to 32 iterations typically required for quantitative SPECT, a high number of iterations, typically 8 to 32, represents a 4-fold to 8-fold increase in reconstruction time compared to typical values of 2 to 4 iterations in cardiology.

Conventional reconstruction software is optimized for speed and with today's computers takes about 5 seconds per iteration on a 64×64 matrix. With 128×128 matrix size and a doubled number of projections, this results in more than one minute being required per iteration. For quantitative SPECT, half-hour reconstruction times are not uncommon, and for dual isotope imaging reconstruction times are on the order of hours.

The present application provides new and improved systems and methods for improving SPECT image quality and reducing reconstruction time, which overcome the above-referenced problems and others.

In accordance with one aspect, a nuclear image optimization system includes a nuclear scanner that acquires nuclear scan data of a volume of interest (VOI), and having one or more collimators that provide a low level of collimation during nuclear scan data acquisition, an object size detector that determines a size of the VOI, and a filter function library having a lookup table that identifies one or more object size-dependent filter functions for each of a plurality of object sizes. The system further includes a processor that performs an iterative reconstruction algorithm, executes the object size-dependent filter function after executing a predetermined number of reconstruction algorithm iterations, and outputs an enhanced nuclear image volume representation.

In accordance with another aspect, a method of increasing nuclear image reconstruction speed for a predetermined number of reconstruction iterations includes acquiring nuclear scan data of an object, determining a size of the object, and identifying an object size-dependent filter function for application to a reconstructed image of the object based on the object size and the predetermined number of reconstruction iterations. The method further includes performing the predetermined number of reconstruction iterations to reconstruct a nuclear image of the object, applying the object size-dependent filter function to the reconstructed image after a selected number of reconstruction iterations to enhance resolution, and storing the enhanced reconstructed image to memory.

In accordance with another aspect, a method of decreasing the number of reconstruction iterations executed to achieve a desired level of image resolution includes acquiring low-collimation nuclear scan data of an object, determining a size of the object, and identifying an object size-dependent filter function for application to a reconstructed image of the object based on the object size and the desired image resolution. The method further includes performing a number of reconstruction iterations to reconstruct a nuclear image of the object, applying the object size-dependent filter function during reconstruction to enhance resolution, and storing the enhanced reconstructed image to memory.

One advantage is that low collimation improves system efficiency and therefore improves signal-to-noise ratio.

Another advantage resides in lower spatial resolution for low collimation that is partly recovered by resolution recovery, which inherently gives an extra noise reduction.

Another advantage resides in enhancing contrast for small objects using an additional filter in Fourier space.

Another advantage resides in improved image quality, specifically contrast to noise ratio, even with a dual matched filter applied.

Still further advantages of the subject innovation will be appreciated by those of ordinary skill in the art upon reading and understand the following detailed description.

The innovation may take form in various components and arrangements of components, and in various steps and arrangements of steps. The drawings are only for purposes of illustrating various aspects and are not to be construed as limiting the invention.

FIGS. 4A-D illustrate examples of reconstructed SPECT images of a volume of interest with a simulated lesion or tumor under various combinations of collimation level and resolution recovery at 16 iterations of a reconstruction algorithm.

Figure 5:
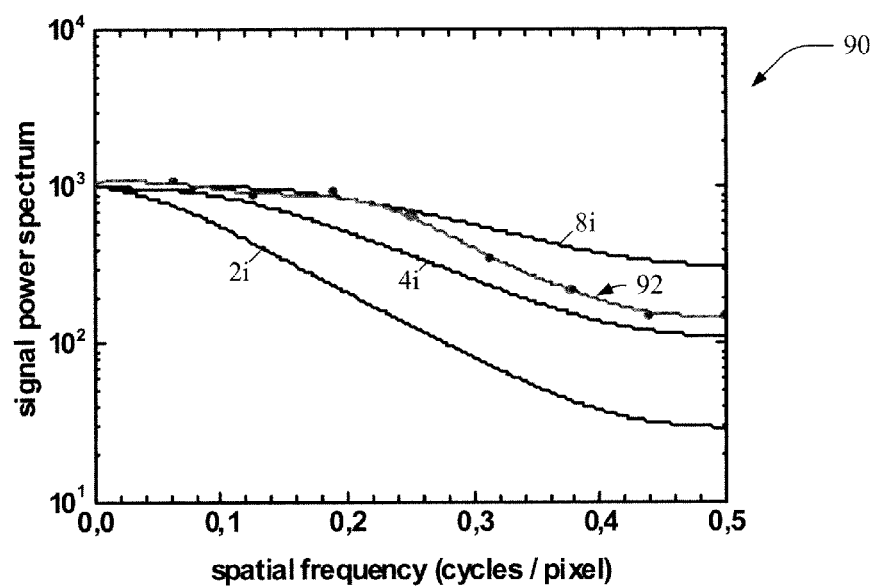

FIG. 5 illustrates a graph showing signal power spectra determined from a simulated object (e.g., having a diameter of approximately 150 mm) on a logarithmic scale.

Figure 6:
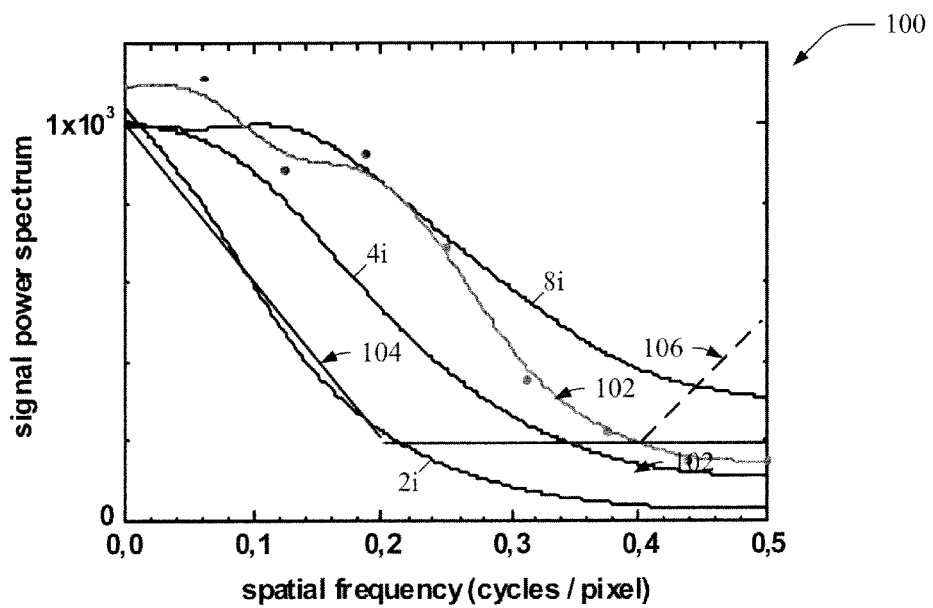

FIG. 6 illustrates a graph showing signal power spectra determined from a simulated object (e.g., having a diameter of approximately 150 mm) on a linear scale.

FIGS. 7A-D illustrate a plurality of reconstructed images of a cross-section of a phantom with a simulated lesion, and associated central profile plots, generated with varying numbers of reconstruction iterations and optional SFD filtering.

Figure 8:
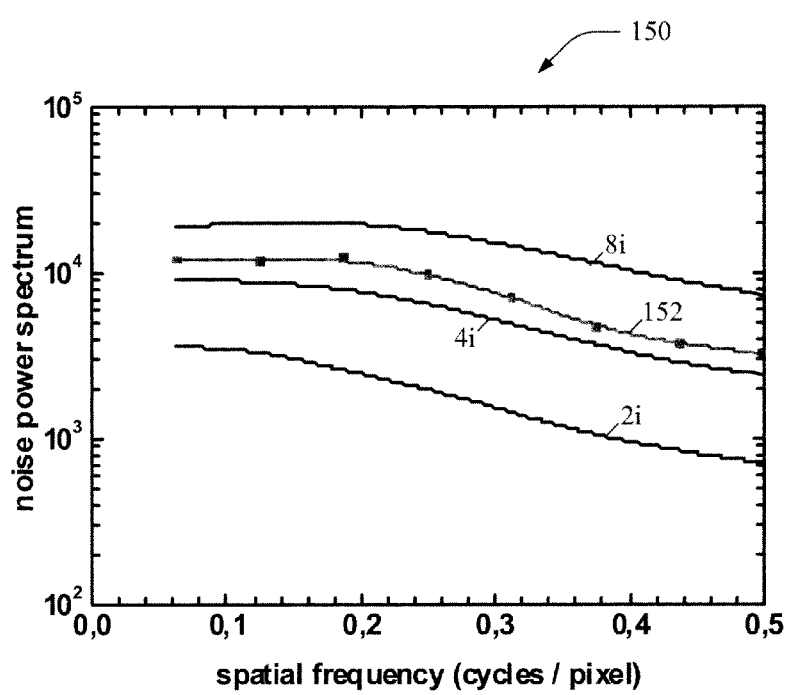

FIG. 8 illustrates a curve representing a noise power spectrum for reconstructed image after 2 iterations with SFD filtering.

Figure 9:
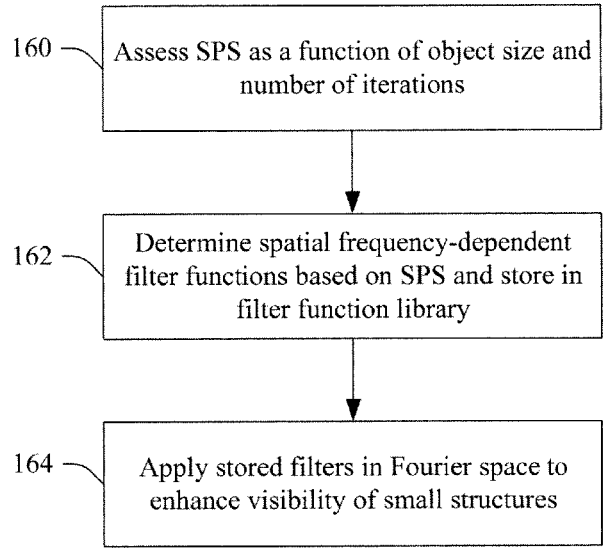

FIG. 9 illustrates a method for reducing nuclear image reconstruction time using SFD filter functions applied to the image in Fourier space after iterative reconstruction.

Figure 10:
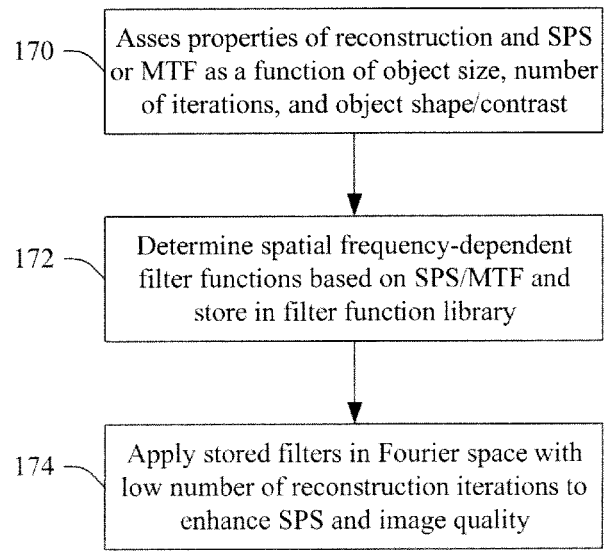

FIG. 10 illustrates a method for improving nuclear image quality for a given number of reconstruction algorithm iterations using SFD filter functions applied to the reconstructed image in Fourier space after the given number of reconstruction iterations.

Figure 1:
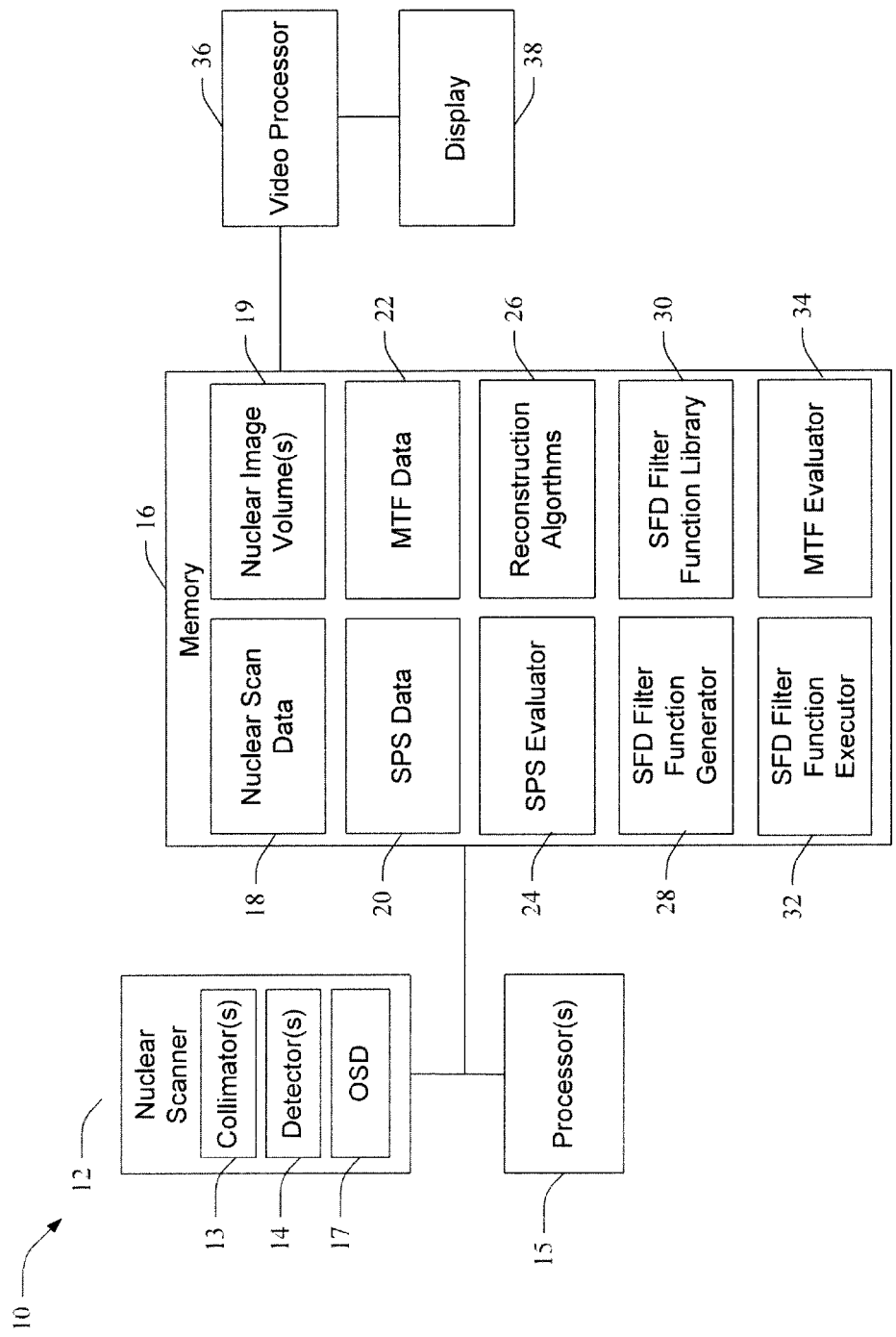
FIG. 1 illustrates a system that facilitates optimizing nuclear images, such as SPECT images, for contrast and noise.

FIG. 1 illustrates a system 10 that facilitates optimizing nuclear images, such as SPECT images, for contrast and noise. The system uses low collimation in combination with iterative reconstruction, resolution recovery and an object size dependent filter applied in Fourier space. The extra filtering step in Fourier space gives increased contrast for small structures and facilitates optimizing for lesion detection and noise performance. Additionally, the system 10 facilitates iterative nuclear image reconstruction that reduces a number of iterations performed for a given level of image quality. In one embodiment, the system 10 replaces a large number of iterations by a much smaller number of iterations with subsequent filtering in Fourier space. Exact filter parameters are specified according to object size and other a priori information, and are pre-determined and stored in an object library.

The system 10 includes a nuclear scanner 12 having one or more collimators 13 for collimating rays incident to a respective nuclear detector 14 that acquires patient data during a scan of a patient or subject. In SPECT imaging, incoming radiation is collimated to define spatial trajectories along which the radiation events originated. The higher the collimator septa, the smaller the viewing cone through each aperture and the finer the resolution, but the less the data that successfully passes the collimator. Conversely, reducing collimation dilates the viewing cone and increases the amount of data detected, and thus increases the signal-to-noise ratio (SNR), but reduces resolution. In order to recover lost resolution due to reduced collimation, the system 10 employs an iterative reconstruction technique that applies position dependent collimator resolution information (e.g., collimator-object voxel distance information) in the forward projection step of a dual matrix reconstructor.

The system further includes a processor 15 that executes, and a memory 16 that stores, computer-executable instructions for carrying out the various steps and/or providing the various functions described herein. The scanner 12 additionally includes an object size detector (OSD) 17 (e.g., a laser gauge, a priori knowledge, one or more proximity sensors, a camera sensor, a CT scanning device, the nuclear detector(s), etc.) that determines the size of a volume of interest or the like. In one embodiment, the object size detector employs a priori knowledge based on acquired nuclear scan data, the angular dependence of the object size in respective transaxial slices of the acquired nuclear scan data, etc. The scanner 12 scans an object or subject and acquires nuclear scan data 18 that is reconstructed into one or more nuclear image volumes 19. In one embodiment, object size is determined from the acquired nuclear scan data and/or the image volume data.

The memory 16 stores signal power spectrum (SPS) data 20 that is derived from the scan data 18 and/or the OSD 17 and is a function of object (e.g., a tumor or other small volume of interest) size. Additionally or alternatively, the memory stores modulation transfer function (MTF) data 22 (e.g., normalized SPS data), which is a function of object size. The processor 15 executes an SPS evaluation algorithm 24 (e.g., a set of computer-executable instructions) to assess SPS data as a function of imaged object size and a number of iterations of a nuclear image reconstruction algorithm 26 to facilitate low-collimation (e.g., 10-12 mm collimation, 18-20 mm collimation, etc.) imaging with resolution recovery during iterative reconstruction.

The processor 15 executes a spatial frequency-dependent (SFD) filter function generation algorithm 28 that identifies or generates SFD filter functions as a function of the evaluated power spectra and/or object size. SFD filter functions are stored to a filter function library 30 in the memory 16 for recall and application during iterative execution of the reconstruction algorithm(s) 26. In one embodiment, the filter function library includes a lookup table that the processor accesses to identify a filter function for a given object size. The processor 16 invokes an SFD filter function executor 32 that applies one or more SFD filter functions in Fourier space during reconstruction of the nuclear image volume 19, which enhances image quality and improves small structure (e.g., tumor) visibility. For instance, the filter function, which is selected as a function of object size, amplifies or boosts one or more high frequency components of the signal power spectrum of the object.

In another embodiment, the system 10 enhances iterative reconstruction by Fourier space filtering to reduce the number of reconstruction iterations needed to achieve a given image resolution. For instance, the processor 15 executes one or both of the SPS evaluation algorithm 24 and an MTF evaluation algorithm 34 to evaluate reconstruction parameters, SPS data 20, and/or MTF data 22, as a function of object size, number of reconstruction iterations, and optionally object shape and/or contrast. The processor 15 executes the SFD filter function generation algorithm 28 that determines, identifies, and/or generates SFD filter functions as a function of the evaluated power spectra and/or the evaluated modulated transform functions, and object size. SFD filter functions are stored to the filter function library 30 in the memory 16 for recall and application during iterative execution of the reconstruction algorithm(s) 26. The processor then executes a small number of iterations of the reconstruction algorithm(s) 26 and invokes the SFD filter function executor 32 to apply one or more identified SFD filter functions in Fourier space during reconstruction of the nuclear image volume 19. In this manner, the signal power spectra for the acquired scan data is enhanced, thereby improving image quality. Once generated, the nuclear image volume 19 is rendered by a video processor 36 for viewing on a display 38 (e.g., a graphical user interface, a video monitor at a user workstation, etc.).

Thus, object size (e.g., pixel count, signal distribution, or some other suitable object size indicator) is used to select an appropriate filter function that reduces a number of reconstruction iterations required to achieve a desired or predetermined image quality, and/or improves image quality for an image reconstructed using a predetermined number of reconstruction iterations. By reducing the number of required reconstruction iterations, reconstruction speed is improved, which facilitates rapid reconstruction of images generated using dual isotopes, quantitative image reconstruction, and any other image that require multiple iterations of a reconstruction algorithm.

In another embodiment, the inverse function of the selected or identified SFD filter function is applied to the reconstructed image in object space. It will be appreciated that object size-dependent filter functions may thus be applied to the reconstructed image in object space and/or as spatial frequency-dependent filter functions applied in Fourier space, as desired by a user for a particular application. Additionally, since such filter functions are the Fourier inverse of each other, object size-dependent filter functions for application in object space may be generated and stored to the filter function library and subsequently inverted to generate corresponding SFD filters, or vice versa.

In another embodiment, a user is permitted to select the degree of filtering applied to the reconstructed image.

Figure 2:
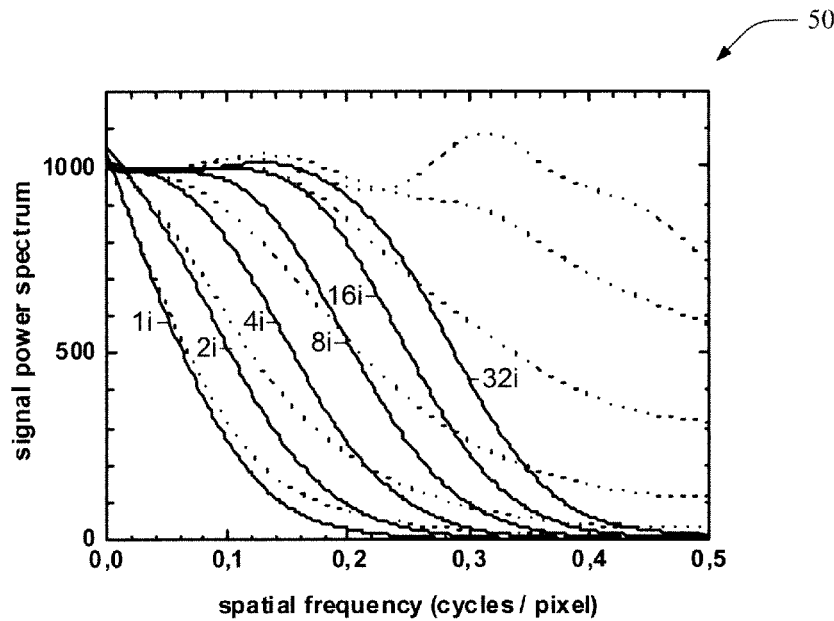
FIG. 2 illustrates a graph showing signal power spectra for standard collimation with resolution recovery (e.g., iterative reconstruction with object position dependent collimator spatial resolution information applied in the forward projection of a dual matrix reconstructor) for an object with a 150 mm diameter.

FIG. 2 illustrates a graph 50 showing signal power spectra for standard collimation with resolution recovery (e.g., iterative reconstruction with object position-dependent collimator spatial resolution information applied in the forward projection of a dual matrix reconstructor) for an object with a 150 mm diameter. From left to right, the solid lines (labeled 1$i$, 2$i$, 4$i$, 8$i$, 16$i$, and 32$i$) represent signal power spectra for 1, 2, 4, 8, 16, and 32 iterations of the reconstruction algorithm, respectively, with resolution recovery. The dotted lines represent corresponding signal power spectra for 1, 2, 4, 8, 16, and 32 iterations of the reconstruction algorithm, respectively, calculated for SPECT projections without collimator resolution.

Figure 3:
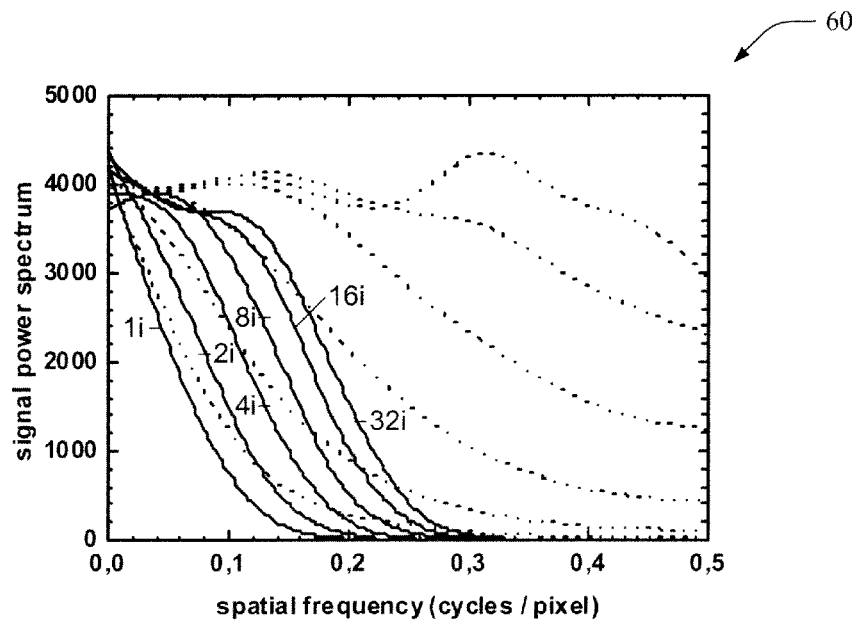
FIG. 3 illustrates a graph showing signal power spectra for low collimation with resolution recovery (e.g., iterative reconstruction with object position dependent collimator spatial resolution information applied in the forward projection of a dual matrix reconstructor) for an object with a 150 mm diameter.

FIG. 3 illustrates a graph 60 showing signal power spectra for low collimation with resolution recovery (e.g., iterative reconstruction with object position dependent collimator spatial resolution information applied in the forward projection of a dual matrix reconstructor) for an object with a 150 mm diameter. From left to right, the solid lines (labeled 1$i$, 2$i$, 4$i$, 8$i$, 16$i$, and 32$i$) represent signal power spectra for 1, 2, 4, 8, 16, and 32 iterations of the reconstruction algorithm, respectively, with resolution recovery. The dotted lines represent corresponding signal power spectra for 1, 2, 4, 8, 16, and 32 iterations of the reconstruction algorithm, respectively, calculated for SPECT projections without collimator resolution.

FIGS. 2 and 3 thus represent examples of power spectra that are evaluated when the processor 15 (FIG. 1) executes the SPS evaluator 24 to assess basic reconstruction properties. It can be seen that, even after 32 iterations, frequencies above 0.2 cycles per pixel are not recovered using low collimation, whereas standard collimation shows a better signal transfer in the medium frequency range. In order to recover resolution, the processor executes the SDF filter function generator 28 to generate one or more filter functions that are applied after iterative reconstruction. For example, the low collimation SPS curve 16$i$ (FIG. 3) for 16 iterations can be selected by the SPS evaluator 24, and the SPS in the frequency range of 0.11-0.16 can be increased by the SFD filter function generator 28, which generates an appropriate normalizing filter, up to a factor of two. Higher frequencies are increased by a constant factor of two to keep image noise low. When the filter generated for a 16-iteration reconstruction process is executed, the information content of the reconstructed image volume 19 is enhanced so that small volumes are more visible.

FIGS. 4A-D illustrate examples of reconstructed SPECT images of a volume of interest 70 with a simulated lesion or tumor 72 under various combinations of collimation level and resolution recovery at 16 iterations of a reconstruction algorithm. FIG. 4A illustrates an image 74 of the volume of interest 70 and simulated lesion 72, generated using standard collimation with resolution recovery. The image exhibits undesirable noise and a low contrast-to noise ratio for the lesion 72.

FIG. 4B illustrates an image 76 of the volume of interest 70 and simulated lesion 72, generated using standard collimation with resolution recovery and a dual-match filter. Application of the dual matched filter results in considerably reduced noise but tends to produce blotchy images and artifacts due to the high content of low frequency noise.

FIG. 4C illustrates an image 78 of the volume of interest 70 and simulated lesion 72, generated using low collimation with resolution recovery. Low collimation with resolution recovery reduces lower noise but may limit visibility of small structures.

FIG. 4D illustrates an image 78 of the volume of interest 70 and simulated lesion 72, generated using low collimation with resolution recovery and an SFD filter. The appropriate SFD filter applied in Fourier space enhances the contrast for small objects. Noise may be slightly increased but gives a much better image than the dual matched filter (FIG. 4B) due to the different noise power spectrum.

FIG. 5 illustrates a graph 90 showing signal power spectra determined from a simulated object (e.g., having a diameter of approximately 150 mm) on a logarithmic scale. From left to right, the solid lines (labeled 2$i$, 4$i$, and 8$i$, respectively) represent signal power spectra for 2, 4, and 8 iterations of the reconstruction algorithm, respectively. A plotted curve 92 represents a signal power spectrum after 2 iterations of the reconstruction algorithm with SFD filtering. As illustrated, the SFD-filtered power spectrum 92 is amplified at the higher-frequency end of the spatial frequency spectrum relative to the unfiltered 2-iteration power spectrum 2$i$.

FIG. 6 illustrates a graph 100 showing signal power spectra determined from a simulated object (e.g., having a diameter of approximately 150 mm) on a linear scale. From left to right, the solid lines (labeled 2$i$, 4$i$, and 8$i$, respectively) represent signal power spectra for 2, 4, and 8 iterations of the reconstruction algorithm, respectively. A plotted curve 102 represents a signal power spectrum after 2 iterations of the reconstruction algorithm with SFD filtering.

An object size-dependent filter function 104 is selected according to the object size, as determined from the SPS for the object at a desired number of reconstruction iterations (two iterations in this example). For instance, at least one corner frequency for the SFD filter can be determined from the analyzed SPS (or MTF) data. The object size-dependent filter function may include an additional high-frequency component 106 to mitigate frequency application in a desired spectral region. Once the object size-dependent filter function is determined, a corresponding SFD filter function is selected for application in Fourier space during image reconstruction.

FIGS. 5 and 6 thus represent examples of signal power spectra that are evaluated when the processor 15 (FIG. 1) executes the SPS evaluator 24 and/or the MTF evaluator 34 to assess basic reconstruction properties. Assessment of signal power spectra (or modulation transfer function, when normalized) shows the development of the transfer function based on the number of iterations. In the example of FIG. 5, only the lowest spatial frequencies are transferred after two iterations (curve 2$i$), but the frequency range of 0-0.15 cycles per pixel is well transferred after eight iterations (curve 8$i$).

This is a general behavior of iterative reconstruction. In this example, SPS are recovered within the full frequency range after 16 to 32 iterations (not shown).

The exact shape of the SPS depends on the size of the object given as a number of voxels. For small objects, the recovery of frequency dependent information is faster than for large objects. Typically, for each halving of object size, the number of reconstruction iterations can be reduced by a factor of 2 to 3.

For the specific object size used in the example of FIGS. 5 and 6, the lower frequency part of the SPS is approximated after two iterations by the object size-dependent filter function curve 104 shown in FIG. 6. In normalized form, the curve 104 has a negative slope from $1\times10^3$ at f=0 to 0.2 at f=0.2, and is constant for f=0.2 to 0.5. In one embodiment, the SFD filter function used for image correction is specified as the inverse of the object size-dependent filter function curve 104, which may be generated by the SFD filter function generator 28 (FIG. 1) upon execution of the SPS evaluator 24 and/or the MTF evaluator 34, and stored to the SFD filter function library 30 for use when reconstructing the nuclear image 19.

The processor 15 (FIG. 1) applies the SFD filter function after a selected number of reconstruction iterations. For example, when only two iterations are used and then the filter function is applied, the information content of the reconstructed image is enhanced by a factor of 1 to 5 in the frequency range f=0 to 0.2, and by a constant factor of 5 in the frequency range f=0.2 to 0.5. The resulting SPS curve is shown as curve 102 in FIGS. 5 and 6, with data points shown together with a B-spline fit.

Figure 7A:
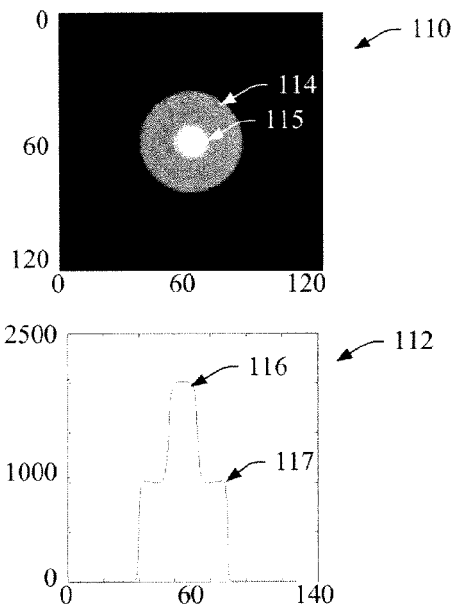

FIGS. 7A-D illustrate a plurality of reconstructed images of a cross-section of a phantom with a simulated lesion, and associated central profile plots, generated with varying numbers of reconstruction iterations and optional SFD filtering. FIG. 7A illustrates an image 110 and corresponding central profile plot 112 for the cross-section of the phantom 114 and simulated lesion 115 after two reconstruction iterations without SFD filtering. The central profile plot exhibits a lesion peak 116 that corresponds to the simulated lesion 115 and smaller phantom peaks 117 that correspond to the phantom 114. The image 110 appears "soft" due to the absence of higher spatial frequencies.

Figure 7B:
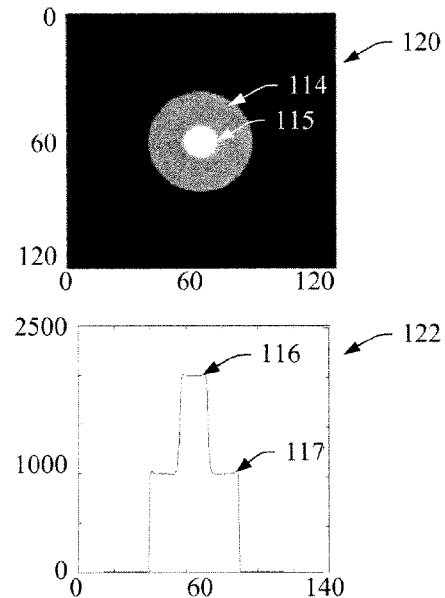

FIG. 7B illustrates an image 120 and corresponding central profile plot 122 for the cross-section of the phantom 114 and simulated lesion 115 after four reconstruction iterations without SFD filtering. The central profile plot exhibits the lesion peak 116 that corresponds to the simulated lesion 115 and smaller phantom peaks 117 that correspond to the phantom 114. The peaks 116 and 117 are sharper than those shown in FIG. 7A, due to overshoot at sharp edges in the object.

Figure 7C:
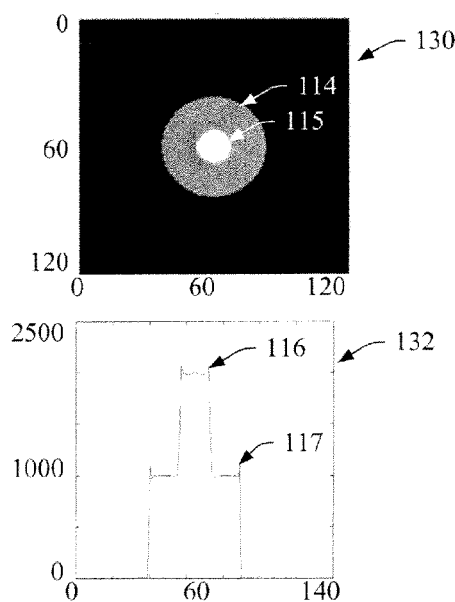

FIG. 7C illustrates an image 130 and corresponding central profile plot 132 for the cross-section of the phantom 114 and simulated lesion 115 after eight reconstruction iterations without SFD filtering. The central profile plot exhibits the lesion peak 116 that corresponds to the simulated lesion 115 and smaller phantom peaks 117 that correspond to the phantom 114. The peaks 116 and 117 are sharper still than those shown in FIG. 7A or 7B, due to increased overshoot at sharp edges in the object after eight iterations.

Figure 7D:
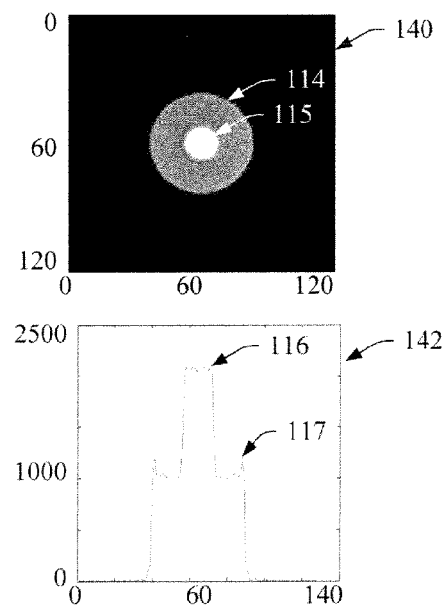

FIG. 7D illustrates an image 140 and corresponding central profile plot 142 for the cross-section of the phantom 114 and simulated lesion 115 after two reconstruction iterations with SFD filtering. The central profile plot exhibits the lesion peak 116 that corresponds to the simulated lesion 115 and smaller phantom peaks 117 that correspond to the phantom 114. The peaks 116 and 117 are sharper than those shown in FIG. 7C (8 iterations without SFD filtering), due to the SFD filter function applied in Fourier space after two reconstruction iterations. Thus, a sharper image is achieved using the described filtering techniques with fewer reconstruction iterations than can be achieved using classical approaches, which both improves image quality and reduces reconstruction time. The slight ring artifact around the perimeter of the phantom 114 in FIG. 7D is caused by the angular structure of the filter function. If desired, a more refined filter function, as well as assessment of function stability with respect to object shape, size, and contrast can be generated to remove such artifacts.

FIG. 8 illustrates a graph 150 showing noise power spectra for reconstructed images after 2, 4, and 8 iterations without SFD filtering, labeled $2i$, $4i$, and $8i$, respectively. A curve 152 represents a noise power spectrum for reconstructed image after 2 iterations with SFD filtering. Noise properties of the filtered image are comparable to noise in an image reconstructed with 4 to 8 iterations.

FIG. 9 illustrates a method for reducing nuclear image reconstruction time using SFD filter functions applied to the image in Fourier space after iterative reconstruction. At 160, signal power spectra information for a nuclear image is assessed as a function of the imaged object size and a number of reconstruction iterations to be performed. At 162, an SFD filter function is generated as a function of the object size and iteration number, and is stored to memory. At 164, the SFD filter function is recalled and applied in Fourier space after the desired number of reconstruction iterations to enhance the visibility of the object using fewer iterations of a reconstruction algorithm than would be necessary without the SFD filter. By reducing the number of iterations required to achieve a desired level of reconstructed image quality, the application of the SFD filter reduces image reconstruction time.

FIG. 10 illustrates a method for improving nuclear image quality for a given number of reconstruction algorithm iterations using SFD filter functions applied to the reconstructed image in Fourier space after the given number of reconstruction iterations. At 170, reconstruction properties (e.g., a number of iterations, etc.), SPS properties, and/or MTF properties are evaluated along with object size and optionally object shape and/or contrast. At 172, one or more SFD filter functions are generated based on the evaluated properties, and are stored to a filter function library. At 174, one or more stored filters are applied in Fourier space to an image that has undergone the predetermined number of reconstruction iterations to refine the image.

In this manner, low collimation techniques are combined with resolution recovery techniques and object size-dependent filtering in Fourier space for image enhancement in nuclear imaging devices. Using object size-dependent filtering in Fourier space facilitates recovering higher-frequency information and adapting lesion detectability and noise power spectra to application parameters.

Additionally, the described systems and methods can be applied in SPECT, PET and other imaging modalities using iterative reconstruction, such as x-ray CT or volume imaging. There is no restriction with regard to collimation geometry since re-binning of pinhole or fan beam data to parallel beam geometry facilitates using standard parallel beam reconstruction techniques. In addition to ordered subset expectation maximization (OSEM), the described systems and methods can be used in combination with any other type of iterative reconstruction, such as maximum likelihood expectation maximization (MLEM), algebraic reconstruction techniques (ART), maximum a posteriori (MAP) techniques, etc.

The innovation has been described with reference to several embodiments. Modifications and alterations may occur

Having thus described the preferred embodiments, the invention is now claimed to be:

1. A nuclear image optimization system, including:
   a nuclear scanner that acquires nuclear scan data of a volume of interest (VOI), and having one or more collimators that provide a low level of collimation during nuclear scan data acquisition;
   an object size detector including a processor configured to determine a size of the VOI;
   a filter function library having a lookup table that identifies one or more object size-dependent filter functions for each of a plurality of object sizes; and
   a processor that performs an iterative reconstruction algorithm, executes the object size-dependent filter function after executing a predetermined number of reconstruction algorithm iterations, and outputs an enhanced nuclear image volume representation.

2. The system according to claim 1, wherein the object size-dependent filter function is a spatial frequency-dependent (SFD) filter function and is applied to the image volume after the predetermined number of reconstruction algorithm iterations.

3. The system according to claim 2, wherein the processor generates the SFD filter function based on at least one of signal power spectrum data and modulation transfer function (MTF) data acquired from nuclear scan data of the VOI or from scan data acquired on appropriate test phantoms.

4. The system according to claim 1, wherein the object size detector determines object size using at least one of a proximity sensor, a camera sensor, a laser gauge, a computed tomography (CT) imaging device, the acquired nuclear scan data, or angular dependence of the object size in respective transaxial slices of the acquired nuclear scan data.

5. A method of increasing image reconstruction speed for a predetermined number of reconstruction iterations, including:
   acquiring scan data of an object;
   determining a size of the object;
   identifying an object size-dependent filter function for application to a reconstructed image of the object based on the object size and the predetermined number of reconstruction iterations;
   performing the predetermined number of reconstruction iterations to reconstruct an image of the object;
   applying the object size-dependent filter function to the reconstructed image after a selected number of reconstruction iterations to enhance resolution; and
   storing the enhanced reconstructed image to memory.

6. The method according to claim 5, wherein the object size-dependent filter function is a spatial frequency-dependent (SFD) filter function and is applied in Fourier space.

7. The method according to claim 6, wherein the scan data is nuclear scan data acquired using a low collimation technique.

8. The method according to claim 7, further including:
   generating one or more SFD filter functions based on object size and on the predetermined number of reconstruction iterations.

9. The method according to claim 8, further including:
   analyzing at least one of signal power spectrum (SPS) data and modulation transfer function (MTF) data when generating the one or more SFD filter functions; and
   determining at least one corner frequency for each SFD filter function from the analyzed spectrum data.

10. The method according to claim 8, further including:
    storing the one or more SFD filter functions to a filter function library for subsequent lookup when identifying an SFD filter function for a determined object size and number of reconstruction iterations.

11. A non-transitory computer-readable medium having stored thereon software for controlling one or more computers to perform the method according to claim 5.

12. A processor programmed to control one or more computers configured to perform the method of claim 5.

13. A single photon emission computed tomography (SPECT) scanner including a processor programmed to perform the method of claim 5.

14. A method of decreasing a number of reconstruction iterations executed to achieve a desired level of image resolution, including:
    acquiring low-collimation nuclear scan data of an object;
    determining a size of the object;
    identifying an object size-dependent filter function for application to a reconstructed image of the object based on the object size and the desired image resolution;
    performing a number of reconstruction iterations to reconstruct a nuclear image of the object;
    applying the object size-dependent filter function during reconstruction to enhance resolution; and
    storing the enhanced reconstructed image to memory.

15. The method according to claim 14, wherein the object size-dependent filter function is a spatial frequency-dependent (SFD) filter function and is applied in Fourier space.

16. The method according to claim 15, further including:
    generating one or more SFD filter functions based on object size and on the predetermined number of reconstruction iterations and evaluation of at least one of signal power spectrum (SPS) data and modulation transfer function (MTF) data for the object; and
    determining at least one corner frequency for each SFD filter function from the analyzed spectrum data.

17. The method according to claim 16, further including:
    storing the one or more SFD filter functions to a filter function library for subsequent lookup when identifying an SFD filter function for a determined object size and number of reconstruction iterations.

18. The method according to claim 14, wherein object size is determined as a function of pixel count for the object.

19. A non-transitory computer-readable medium having stored thereon software for controlling one or more computers to perform the method according to claim 14.

20. A processor programmed to control one or more computers configured to perform the method of claim 14.

21. A single photon emission computed tomography (SPECT) scanner including a processor programmed to perform the method of claim 14.

* * * * *